May 5, 1959  F. A. WAGNER  2,884,693
METHOD OF MAKING DISC TYPE BRAKE DRUMS
Filed Feb. 16, 1955  2 Sheets-Sheet 1

Inventor
Frederick A. Wagner
by Parker & Carter
Attorneys

May 5, 1959  F. A. WAGNER  2,884,693
METHOD OF MAKING DISC TYPE BRAKE DRUMS
Filed Feb. 16, 1955  2 Sheets-Sheet 2
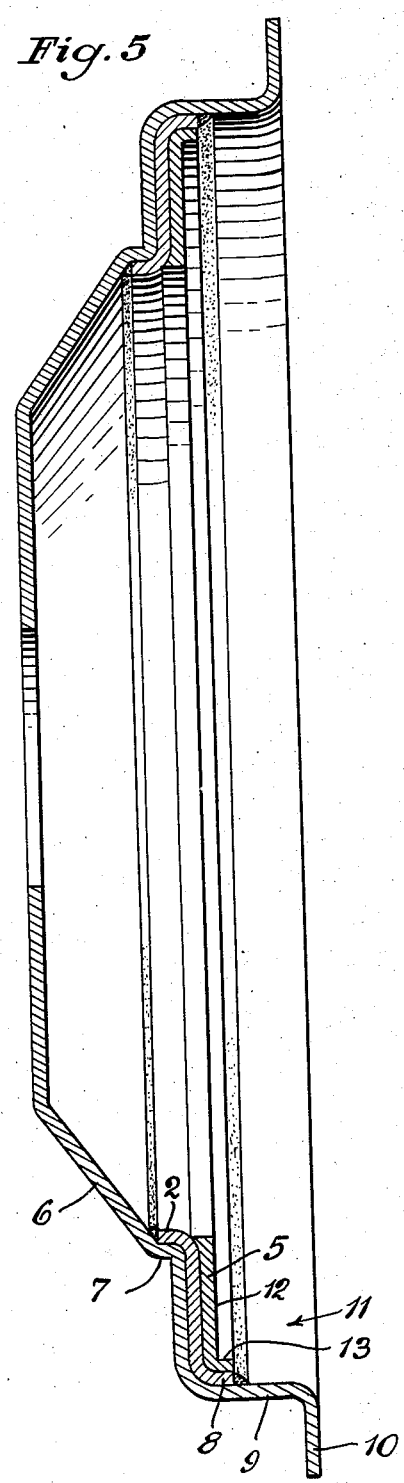
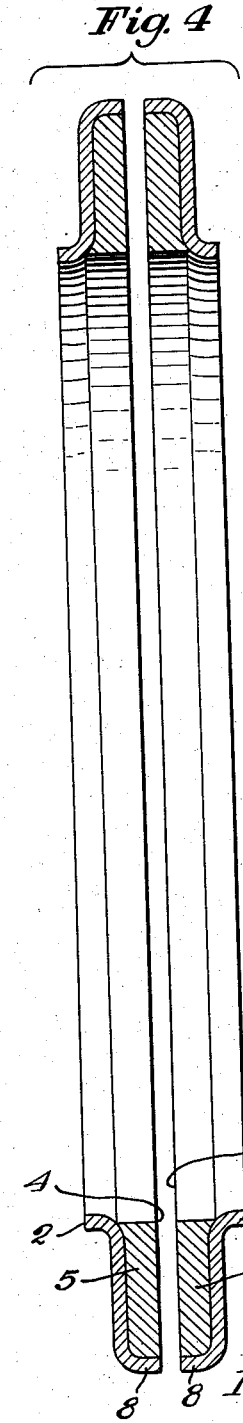
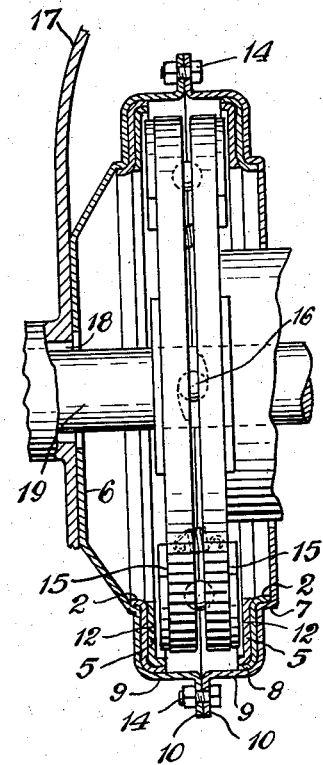
Inventor
Frederick A. Wagner
by Parker & Carter
Attorneys United States Patent Office 2,884,693
Patented May 5, 1959

2,884,693

METHOD OF MAKING DISC TYPE BRAKE DRUMS

Frederick A. Wagner, East Lansing, Mich., assignor, by mesne assignments, to Textron American, Inc., Providence, R.I., a corporation of Rhode Island Application February 16, 1955, Serial No. 488,518

2 Claims. (Cl. 29—529)

This invention relates to improvements in method of making annular composite cast iron and steel brake rings for use in connection with disc type brakes for automotive use and the like.

One object of the invention is to provide a method of making composite brake ring having an annular cast iron brake shoe engaging surface together with a steel or wrought metal reinforcing shell.

Another object is to provide a brake ring wherein heat flow from a cast iron annular brake shoe engaging ring will be promoted.

Another object is to combine the structural strength and lightness of wrought steel in a disc type brake with the better wearing and braking characteristics of cast iron to produce a composite disc type brake assembly of greatly increased strength and greatly reduced weight over that heretofore known to the automotive industry.

It will be understood that cast iron disc brake assemblies are well known. They have the advantage that they provide a cast iron brake shoe engaging surface but they are heavy, they do not readily dissipate heat because of the low conductivity of cast iron and since cast iron is a relatively brittle structural material, they are subject to breakage. On the other hand, steel disc type assemblies have been tried and they can be made light and they adequately conduct heat but steel is notorious as a very poor surface for contact with the brake shoe.

It is proposed, therefore, to cast an iron brake shoe engaging ring in fused bond relationship with a steel reinforcing shell, which shell may thereafter be welded to a supporting web as part of a disc type brake assembly.

Other objects will appear from time to time throughout the specification and claims.

This invention is illustrated more or less diagrammatically in the accompanying drawings, wherein—

Figure 4 is a section through the shell after the two halves of the reinforcing ring or mold and the cast iron ring have been separated;

Figure 5 is a section through the ring, shell and supporting web.

Figure 6 is a section with parts omitted through a disc brake assembly embodying the invention.

Like parts are indicated by like characters throughout the specification and drawings.

Figure 1:
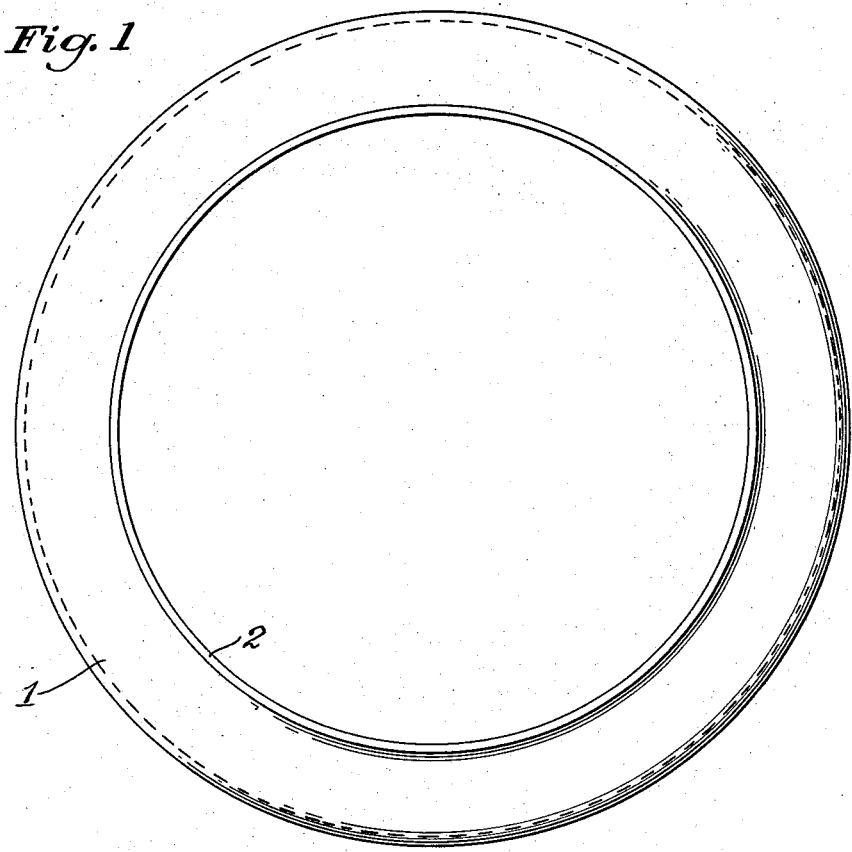
Figure 1 is a side elevation of a steel reinforcing ring or mold.
Figure 2:
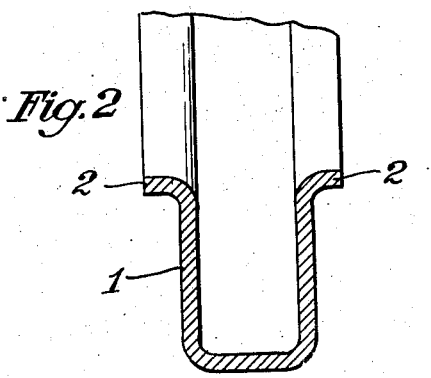
Figure 2 is a section through the shell before the iron is cast.
Figure 3:
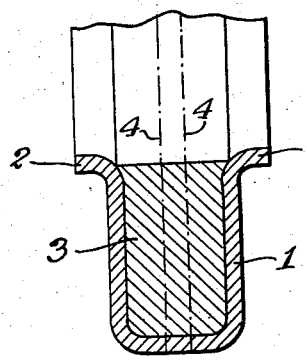
Figure 3 is a section through the shell after the iron is cast.

1 is a U-shaped annular steel or wrought metal reinforcing ring which in the first instance serves as a mold. This ring is as indicated, U-shaped in cross section and the inner peripheries of the two parallel walls of the U are outwardly flanged as at 2.

This mold is intended to be spun in a spinner and while spinning to receive cast into it a suitable supply of grey iron. The spinner, the mounting of the mold in the spinner and the casting form no part of the present invention and are therefore not here illustrated. Suffice it to say that after the metal has been cast, the U-shaped mold will contain a mass of cast iron 3, which by centrifugal force and by control of the temperature of the iron and of the mold will be in fused bond relationship with the entire opposed surfaces of the steel mold.

The resultant annular casting with the shell or mold 1 may then be cut apart by the use of any suitable cutting tool removing that portion of the iron between the lines 4—4 and cutting through the steel mold. Thus there results two separate annular cast iron rings backed on two sides by the steel shell. Each ring shown at 5 with its steel shell backing may then be welded as indicated to a web 6, the flange 2 overlying a shoulder 7 in the web 6, the lower portion of the U 8 being generally parallel with the cylindrical portion 9 of the web. The web is flanged at 10 and if two such webs with the iron ring welded therein are brought together and held in close permanent relationship, and annular pocket is defined as indicated at 11, bounded on opposed sides perpendicular to the axis of rotation by the brake engaging surface of the opposed iron braking surface rings 5.

In the particular relationship shown after the two halves of the iron ring have been cut away as indicated at 4, the thickness of the iron ring may be reduced to any desired point by cutting away that portion of the iron as at 12, leaving if desired about the outer periphery of the ring 5, a flange 13. On the other hand, if no such reduction in thickness is desired, the total thickness of the iron annular ring will be that resulting from the cutting away between the lines 4—4 to separate the iron ring and the steel reinforcing shell.

Under some circumstances, this cutting will be by any suitable cutting tool which may, as the shell is rotated, cut from the inside out or from the outside in as is well known in the metal machining art. On the other hand, it is equally possible to split the two halves of the U-shaped mold and the annular iron ring apart by any suitable means. In either case, there results a cast iron ring of suitable thickness arranged about the outer periphery of the assembly and welded and held in heat conducting relationship with the web which supports the parts and closes the brake mechanism not here shown and holds by cooperation with a similar web the two rings together.

14 indicates bolts holding together the flanges 10. 15 indicates diagrammatically brake shoes adapted to be spread apart by any suitable mechanism 16 not here illustrated in detail to force the shoes against the friction shoe engaging iron surfaces 12. 17 indicates a wheel web to which the drum 6 is attached, being apertured at 18 to permit the axle 19 to pass through. The details of the wheel forming no part of the invention, are not here illustrated.

It will be noted that the annulus 3 of cast iron is much wider in a radial than in an axial direction and that each half of the U-shaped ring or shell 1 is socketed in the web 6, there being an interlock at 2 and 7 and at 8 and 9, so that the thin steel reinforcing member is in close intimate contact with the web or shell 6 throughout its entire superficial area, thus insuring adequate heat flow from the iron through the reinforcing ring to the web.

In general, the range of temperature of the steel shell or web is between 1200 and 1500° F. The range of temperatures for the molten iron as it is poured is from 2700 to 3000°. The steel shell in which the iron is poured will for example range in thickness from .062 to .218 inch.

Generally speaking as the ratio of weight between the steel and iron approaches unity, the temperature of both the iron and the shell should be increased. As the ratio of steel to iron decreases, the temperature of both the iron and the steel shell decreases. For example, in one aircraft drum the ratio of iron to steel is so high that the shell is not heated. In that case, there are 67 pounds of iron to 16 pounds of steel, but it will be understood that the production of a disc drum of such ratio would be unusual. As a general proposition the higher ranges for both iron and steel will be used because the ratio of the iron to the steel will be about the same. The smaller the drum, the thicker and stiffer must the shell be in proportion.

I claim:

1. The method of facing a wrought steel disc brake web with a cast iron brake engaging surface which consists in spinning a thin U-shaped annular steel shell, which is substantially deeper radially than its axial width and is open about its inner periphery, pouring molten iron into such shell in such quantity as to fill it with an annular ring of molten iron the radial width of which greatly exceeds its axial thickness, continuing the spinning of the shell and ring until the iron has hardened and a continuous integral fused bond has been formed between the iron and the steel, then forming a clean smooth surface for brake shoe application by cutting the resultant composite iron and steel body into two substantially equal halves along a plane perpendicular to the axis of rotation of the shell, then welding the steel of the shell to a and rings in opposed axially spaced apart relationship to wrought steel disc brake web and assembling such shells form a disc brake housing.

2. The method of forming a brake shoe housing for disc brakes which comprises forming two concave generally circular outwardly flange wrought steel webs, centrifugally casting into a U-shaped shell which is open about its inner periphery a mass of molten iron until the shell is filled with an annular iron ring the radial width of which greatly exceeds its axial thickness and a fused bond is formed between the iron and steel, then forming a clean smooth surface for brake shoe application by cutting the resultant composite iron and steel body into two substantially equal halves along a plane perpendicular to the axis of rotation of the shell, welding the steel portion of one of the composite iron and steel bodies to the inner face of each of the webs adjacent their outer peripheries and then joining the opposed flanges of the webs together outside of the outer peripheries of the iron rings to hold the opposed faces of the iron rings in axially spaced apart opposition.

References Cited in the file of this patent

UNITED STATES PATENTS

| | | |
|---|---|---|
| 2,035,142 | Campbell | Mar. 24, 1936 |
| 2,085,727 | Campbell | July 6, 1937 |
| 2,112,697 | Van Halteren | Mar. 29, 1938 |
| 2,294,466 | Le Jeune | Sept. 1, 1942 |
| 2,366,262 | Hollerith | Jan. 2, 1945 |
| 2,476,151 | Le Jeune | July 12, 1949 |
| 2,529,348 | Mustee | Nov. 7, 1950 |
| 2,595,859 | Lambert et al. | May 6, 1952 |